US008650755B2

(12) United States Patent
Lee et al.

(10) Patent No.: US 8,650,755 B2
(45) Date of Patent: Feb. 18, 2014

(54) METHOD AND EQUIPMENT OF MAKING A LENGTH OF HEAT CONDUCTION PIPE IN A VACUUM ENVIRONMENT FROM A SEMI-FINISHED HEAT CONDUCTION PIPE

(75) Inventors: Ke-Chin Lee, Yangmei Town, Taoyuan County (TW); Chih-Sheng Wang, Taipei (TW); Chi-Te Chin, Hsinchu (TW)

(73) Assignee: Zhongshan Weiqiang Technology Co., Ltd., Zhongshan, Guangdong (CN)

( * ) Notice: Subject to any disclaimer, the term of this patent is extended or adjusted under 35 U.S.C. 154(b) by 2106 days.

(21) Appl. No.: 11/485,567

(22) Filed: Jul. 12, 2006

(65) Prior Publication Data

US 2007/0289134 A1 Dec. 20, 2007

(30) Foreign Application Priority Data

May 25, 2006 (TW) ............................... 95118535 A

(51) Int. Cl.
*B23P 6/00* (2006.01)

(52) U.S. Cl.
USPC ............. 29/890.032; 29/890.045; 29/890.053

(58) Field of Classification Search
USPC ........... 29/890.032, 890.045, 890.053, 527.1, 29/557, 558, 726
See application file for complete search history.

(56) References Cited

U.S. PATENT DOCUMENTS 7,467,465 B2 * 12/2008 Li ........................... 29/890.032
2006/0183374 A1 * 8/2006 Shih et al. ..................... 439/587

FOREIGN PATENT DOCUMENTS

TW 94107133 3/2005

* cited by examiner

*Primary Examiner* — David Bryant
*Assistant Examiner* — Ryan J Walters
(74) *Attorney, Agent, or Firm* — Bucknam and Archer

(57) ABSTRACT

A method of making a length of heat conduction pipe from a long conduction pipe filled with heat transfer medium in vacuum environment comprises: a material preparation step in which a long heat conduction pipe with predetermined length sealed at both ends is prepared, a squelching and cutting step in which squelching and cutting is conducted on pre-determined point of said long heat conduction pipe in vacuum environment; a sealing step by which the cut end of said long heat conduction pipe is brazed and sealed in vacuum. There also provides an equipment for performing the method.

1 Claim, 6 Drawing Sheets

METHOD AND EQUIPMENT OF MAKING A LENGTH OF HEAT CONDUCTION PIPE IN A VACUUM ENVIRONMENT FROM A SEMI-FINISHED HEAT CONDUCTION PIPE

BACKGROUND OF INVENTION

1. Field of Invention

This invention relates to a method of making a length of heat conduction pipe in a vacuum environment, especially to a method by which a length of heat conduction pipe is made from a semi-finished heat conduction pipe with squelching, cutting and sealing steps in a vacuum environment.

2. Prior Art

Conventionally, heat conduction pipe is manufactured in batch according to demand of customer. Due to the variation in length for each batch, it is almost impossible to carry out planned-production for finished pipes stock. Furthermore, the production efficiency of batch type production is low, which often fails to meet the delivery due to the time-consuming process, as well as difficulty in production control for automatic production process.

In the Taiwanese Patent No. 1250913, a manufacturing method for heat conduction pipe is disclosed by the applicant, aiming at solving the above-mentioned problem, as shown in FIG. 1, in which a certain stock quantity of semi-finished heat conduction pipe with extended length longer than ordinary requirement is prepared in advance, and said semi-finished heat conduction pipe stock is cut to required length according to the order of customer. Thereby, the disadvantage in traditional batch manufacturing of heat conduction pipe is improved. This manufacturing method includes at least following steps as below:

1. a preparation step—in which bare Cu pipe of fixed size are prepared.
2. a primary sealing step—in which one end of the bare Cu pipe is squelched and brazed.
3. a powder filling step—in which metal powder is filled into each Cu pipe at the other end after the insertion of a coaxial center pin into each Cu pipe.
4. a sintering step—in which each Cu pipe is heated so that the metal powder forms a porous layer in the inner wall of each Cu pipe, and the center pin is retreated thereafter.
5. an evacuation and liquid filling step—in which heat transfer medium is filled into the interior of each Cu pipe after evacuation in the interior of each Cu pipe.
6. a secondary sealing step—in which the other end of each Cu pipe is sealed and squelched so as to finish the semi-finished product.
7. a shrinking step—in which the diameter at certain fixed point of each semi-finished Cu pipe is shrunken so that the length from the sealed end to the shrunken point of Cu pipe, i.e., the total length meets customer's need.
8. a cutting and brazing step—in which the semi-finished Cu pipe is heated and cut at the shrunken point and then brazed to seal.
9. a shaping step—in which Cu pipe thus cut to fixed length is bent or flattened to required profile according to customer's need.

The main features of the above publication, as shown in FIG. 2(2A~2E), includes step 7, i.e., the shrinking step, and step 8, i.e., the cutting and brazing step. Specifically, the semi-finished heat conduction pipe (100') is cut to suitable length according to customer's demand. Since sealability is the most important feature of a heat conduction pipe for good function, it is very important not to destroy the sealability during the cutting of the semi-finished heat conduction pipe (100'). Therefore, shrinking is firstly conducted at the portion (101) to be cut, then squelching and cutting is executed, so that vacuum within the pipe is better maintained. At present, these processes are almost conducted at atmosphere condition. Because the atmospheric pressure is far bigger than the pressure inside the pipe, it often happens that the vacuum within pipe is vanished away at the instant of breakage occurred during squelching and sealing process.

In order to solve this problem, traditionally the semi-finished heat conduction pipe (100') is disposed vertically in length determination method. A heater device (110) is used to heat the bottom portion of the pipe to a predetermined temperature, then the squelching and cutting is carried out at the shrunken portion (101), by a squelching and cutting equipment (120), and then brazing is conducted at the cut portion. At last, Cu pipe thus cut to fixed length is bent or flattened to required profile according to customer's need. The purpose of heating conducted at the bottom portion of pipe by the heater device (110) is, on one hand, the residual gas remained during the evacuation and liquid filling process is expelled to the upper portion, i.e., the portion to be cut (100*a*), which can be removed during cutting. One the other hand, positive pressure is generated within the pipe by heating so as to avoid the vacuum from becoming ineffective caused by the infiltration of outside gas happened during squelching and cutting. Heating temperature, e.g. for water as working medium within pipe, generally is controlled at 100° C. such that the pressure in the pipe becomes positive, i.e., bigger than atmospheric pressure.

Although positive pressure generated in pipe by heating can prevent the vacuum from becoming ineffective during execution of the method of length determination, however, the persons skilled in the art should understand that it is difficult to control precisely the heating temperature in view of the variation in property of each pipe. In addition, working medium more or less suffers vapor leakage during breakage happened in squelching and cutting step due to the fact that saturated vapor is filled within the heat conduction pipe, when the pipe is heated to 100° C. The leakage quantity is closely linked with the step of breakage, besides, it is deeply concerned with the temperature of heat conduction pipe. In other words, the higher the temperature of heat conduction pipe is, the bigger the leakage quantity becomes. For example, the saturated vapor pressure of water at 100° C. is 1.0 $kg/cm^2$, while at 110° C. is 1.46 $kg/cm^2$, the difference of saturated vapor pressure between these two temperatures is 46% at 10° C. difference in temperature. Therefore, the working medium charge quantity often suffers inconformity, even in each heat conduction pipe of the same production batch, which is usually the main factor of quality uncertainty in each production batch.

SUMMARY OF INVENTION

Therefore, the main object of the present invention is to provide a method of length determination in vacuum environment for heat conduction pipe, which conducts squelching, cutting and sealing step on semi-finished heat conduction pipe in vacuum condition according to length requirement from customer.

In order to achieve the above object, a method of length determination in vacuum environment for heat conduction pipe is provided, wherein it at least comprises: a material preparation step in which semi-finished heat conduction pipe with predetermined length sealed at both ends is prepared, a squelching and cutting step in which squelching and cutting is conducted on certain fixed point of said semi-finished heat conduction pipe in vacuum environment by a squelching and cutting device, a sealing step, in which the cut end of said semi-finished heat conduction pipe is brazed and sealed in vacuum environment by a brazing device.

The other object of this invention is to provide an equipment of length determination in vacuum environment for heat conduction pipe, which comprises: a housing having an enclosed space, an evacuation device provided outside said enclosed space for evacuating said enclosed space into vacuum state, a squelching and cutting device provided in said enclosed space for conducting squelching and cutting at certain point on semi-finished heat conduction pipe, a brazing device provided in said enclosed space for brazing and sealing the cut point of semi-finished heat conduction pipe.

According to this invention, residual gas generated during evacuation and liquid filling process can be expelled to the upper portion, i.e., the cut portion and removed by heating before squelching and cutting process, and the heating, if needed, at low temperature is enough. Therefore, the working medium vapor leakage loss is quite few, and effective control on the working medium quantity can be strictly conducted so as to increase yield rate of heat conduction pipe finished product.

BRIEF DESCRIPTION OF ACCOMPANIED DRAWINGS

DETAILED DESCRIPTION OF PREFERRED EMBODIMENTS OF THE INVENTION

The technical features of the present invention will become more apparent by the following detailed description of preferred embodiments in conjunction with the accompanied drawings. However, said embodiments are for illustrative purpose only, and should not be considered as limitation on the range of claims for the present invention.

Firstly, the semi-finished heat conduction pipe of this invention is prepared according to the Taiwanese Patent No. 1250913 owned by the applicant, entitled "Manufacturing Method for Heat Conduction Pipe", in which a certain stock quantity of semi-finished heat conduction pipe with extended length longer than ordinary requirement is prepared in advance.

Figure 1:
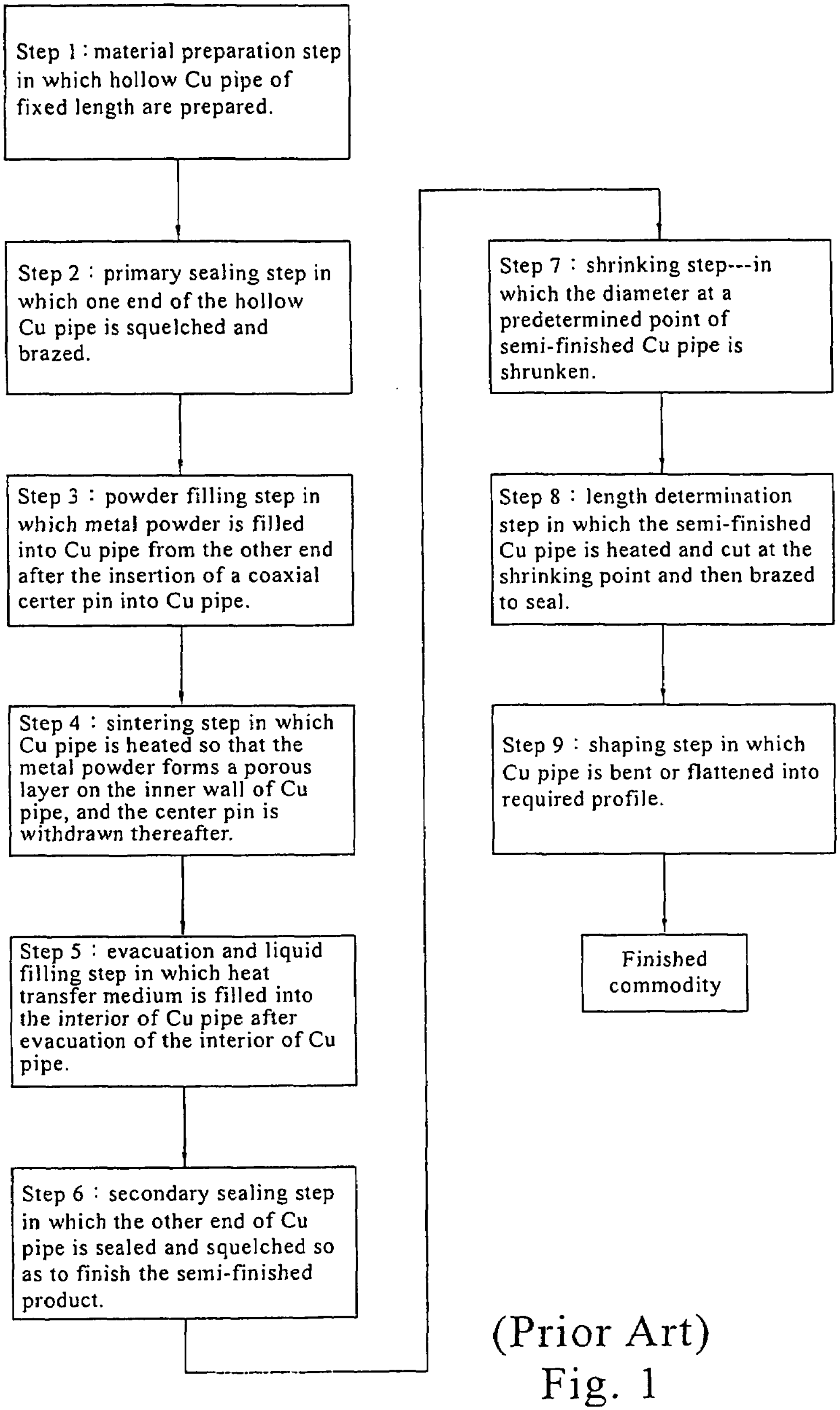
FIG. 1 is a block diagram for manufacturing heat conduction pipe shown in Taiwanese Patent No. 1250913.
Figure 2:
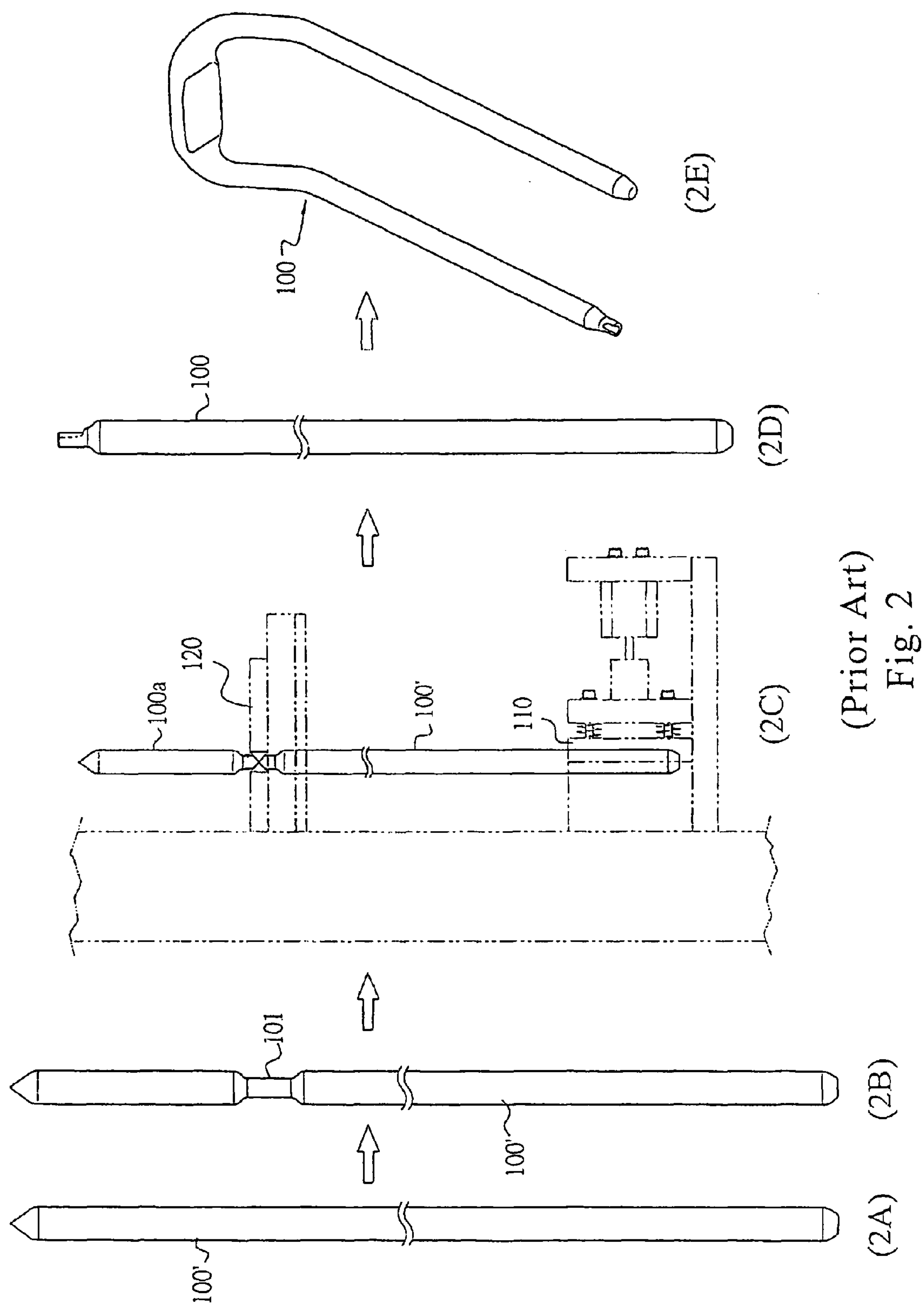
FIG. 2 (2A~2E) are schematic views showing the flow chart of shrinking process, length determination process, squelching and shaping process etc. associated with FIG. 1.
Figure 3:
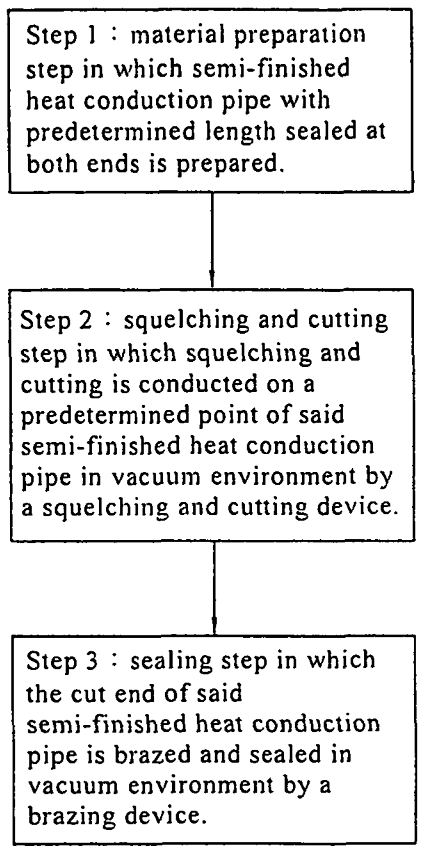
FIG. 3 is a block diagram of flow chart showing the 1$^{st}$ length determination method of heat conduction pipe of this invention.
Figure 4:
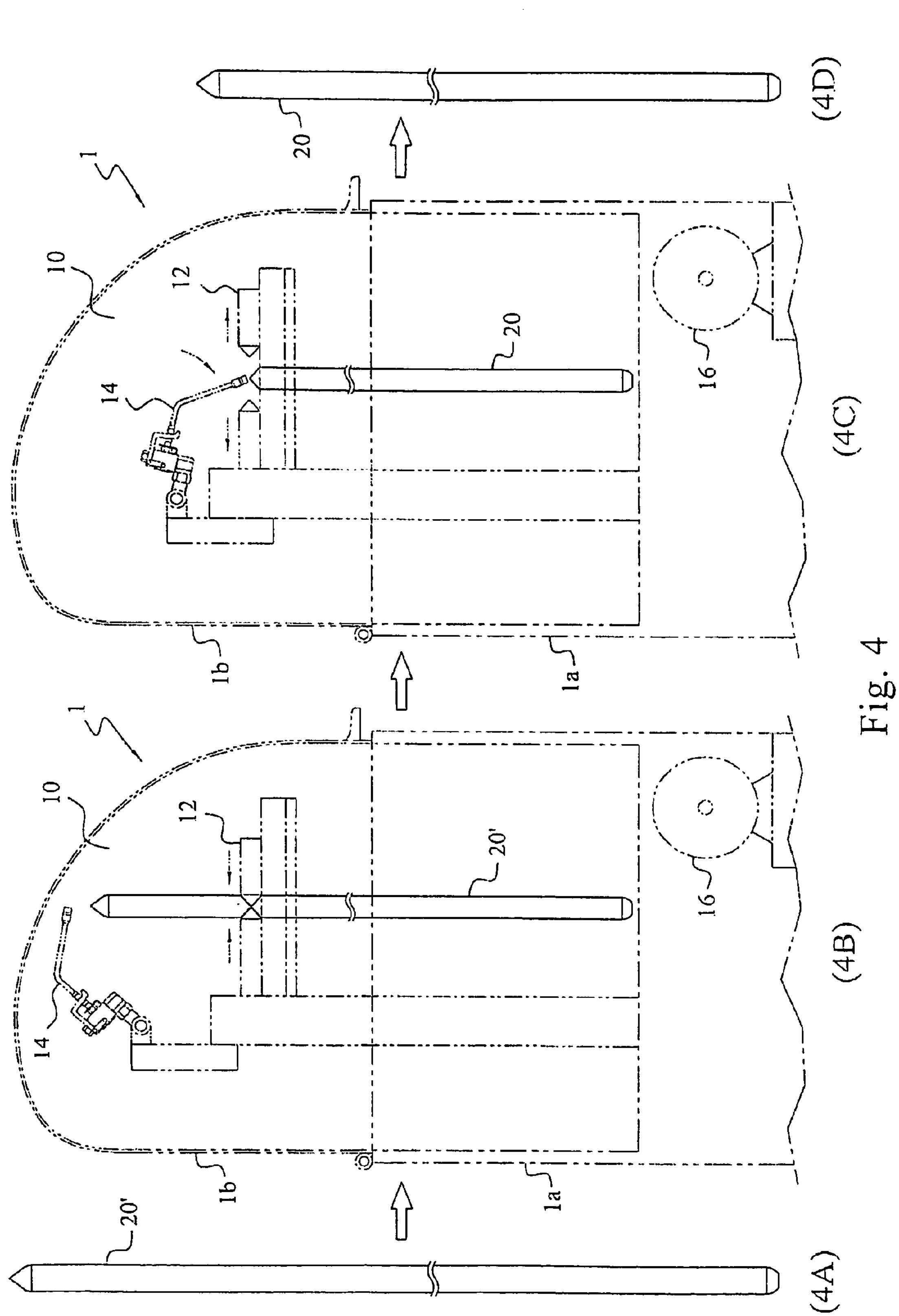
FIG. 4 (4A~4D) are schematic views showing the flow chart of length determination process of heat conduction pipe of this invention.

FIGS. 3 and 4 show the 1$^{st}$ embodiment of the length determination method of heat conduction pipe of this invention, mainly including the following steps:

- a material preparation step—in which semi-finished heat conduction pipe 20' with a predetermined length sealed at both ends is prepared,
- a squelching and cutting step—in which squelching and cutting is conducted on a fixed point of said semi-finished heat conduction pipe 20' in vacuum environment 10 by a squelching and cutting device 12,
- a sealing step—in which the cut end of said semi-finished heat conduction pipe 20' is brazed and sealed in vacuum environment 10 by a bra zinging device 14.

FIG. 4A~4D are schematic views showing the flow chart of length determination method of heat conduction pipe of this invention. The length determination equipment 1 for conducting said length determination method at least comprises:

- a housing 1*a* having an enclosed space 10 preferably provided with a see-through type mask portion 1*b* which can be opened for convenience.
- an evacuation device 16, for example a vacuum pump etc., provided outside said enclosed space 10 for evacuating said enclosed space 10 into vacuum state.
- a squelching and cutting device 12 provided in said enclosed space 10 for conducting squelching and cutting at certain point on semi-finished heat conduction pipe.
- a brazing device 14 provided in said enclosed space 10 for brazing and sealing the cut point of semi-finished heat conduction pipe 20'.

According to this invention, as the pressure outside the pipe is under negative pressure, the outside gas is prevented from infiltrating into pipe at the instant of breakage happened during the squelching, cutting and sealing operation on said semi-finished heat conduction pipe 20' in the enclosed space 10. Thus, the shrinking process and heating procedure can be omitted so that the disadvantage in current length determination operation is improved. Good result is obtained even at normal temperature without heating. Thus, there is no problem with respect to vacuum failure within pipe.

Figure 5:
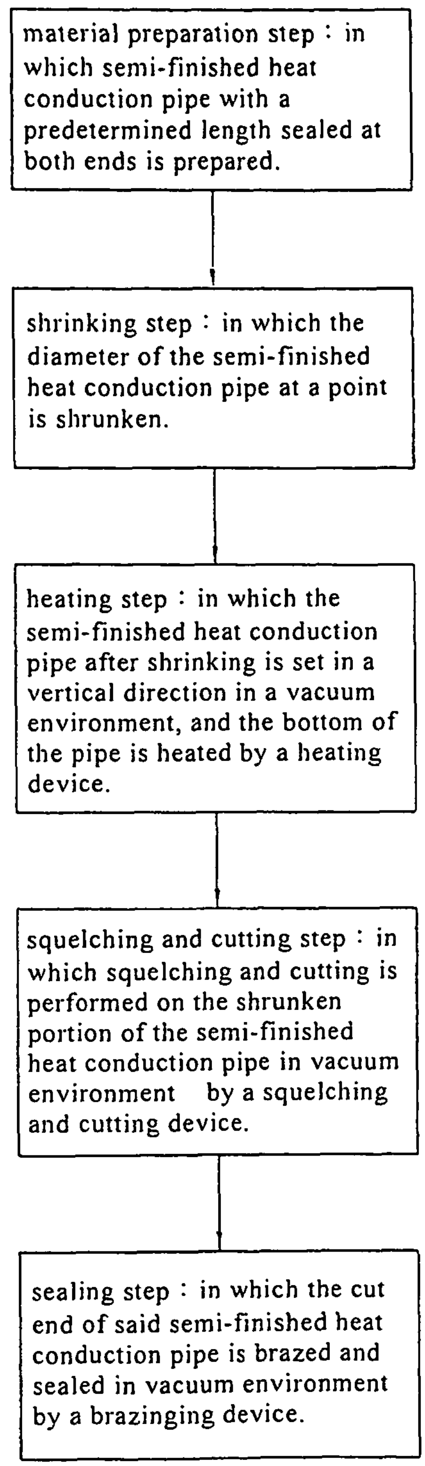
FIG. 5 is a block diagram of flow chart showing the 2$^{nd}$ length determination method of heat conduction pipe.
Figure 6:
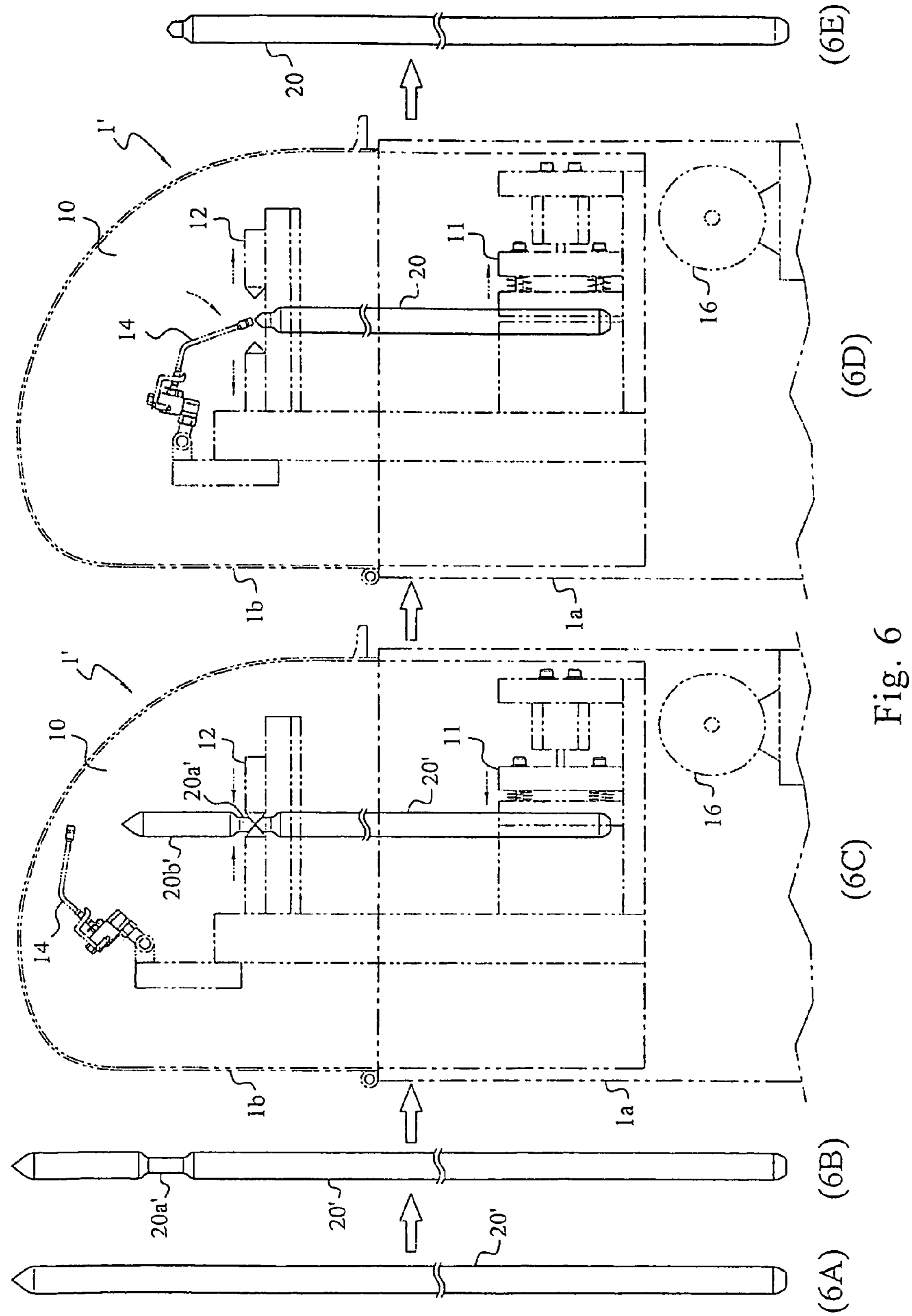
FIG. 6 (6A~6E) are schematic views showing the flow chart of length determination process of heat conduction pipe associated with FIG. 5.

FIGS. 5 and 6 show the 2$^{nd}$ embodiment of the length determination method in vacuum condition for heat conduction pipe of this invention, in which residual gas generated during evacuation and liquid filling step can be expelled to the upper portion, i.e., the cut portion and removed, by heating at low temperature before squelching and cutting process so as to get better vacuum level. This embodiment mainly includes the following steps:

- a material preparation step—in which semi-finished heat conduction pipe 20' with a predetermined length sealed at both ends is prepared,
- a shrinking step—in which the diameter at certain point on each semi-finished heat conduction pipe 20' is shrunken to a diameter 20*a'*.
- a heating step—in which the semi-finished heat conduction pipe 20' after shrinking to diameter 20*a* is disposed vertically in a vacuum environment 10, and the bottom of the pipe 20' is heated by a heating device 11.
- a squelching and cutting step—in which squelching and cutting is conducted on the shrunken portion 20*a'* of each semi-finished heat conduction pipe 20' in vacuum environment 10 by a squelching and cutting device 12.
- a sealing step—in which the cut end of said semi-finished heat conduction pipe 20' is brazed and sealed in vacuum environment 10 by a bra zinging device 14.

FIG. 6A~6E is schematic views showing the flow chart of length determination method in vacuum condition for heat conduction pipe according to the invention. The length determination equipment 1 for conducting said length determination method at least comprises

- a housing 1*a* having an enclosed space 10 preferably provided with a see-through type mask portion 1*b* which can be opened for convenience.

an evacuation device 16, for example a vacuum pump etc., provided outside said enclosed space 10 for evacuating said enclosed space 10 into vacuum state.

a heating device 11 provided in said enclosed space 10, which is used to heat the bottom portion of the semi-finished heat conduction pipe 20'.

a squelching and cutting device 12 provided in said enclosed space 10 for conducting squelching and cutting at certain point on semi-finished heat conduction pipe.

a brazing device 14 provided in said enclosed space 10 for brazing and sealing the cut point of the semi-finished heat conduction pipe 20'.

According to this invention, this embodiment has a shrinking step before the squelching and cutting step, i.e., to shrink partly the diameter at a certain point to be cut on the semi-finished heat conduction pipe 20' in advance. Besides, a heating device 11 is used to heat the bottom portion of the semi-finished heat conduction pipe 20' before the squelching and cutting step, so that residual gas generated during evacuation and liquid filling step can be expelled to the upper portion, i.e., the portion 20*b'* to be cut off and removed. It is these two steps that this embodiment is different from the previous embodiment. According to this invention, the heating, if needed, at a temperature lower than boiling point 100° C. at normal pressure is conducted on the heat conduction pipe in vacuum environment. The saturated vapor pressure of the working medium, for example, water at a heating temperature, for example, 50° C. (the saturated vapor pressure at 50° C. is 0.123 kg/cm$^2$) is only ⅛ of the saturated vapor pressure at 100° C. In this case, the working medium vapor leakage loss is quite limited, and effective control on the working medium quantity can be strictly conducted so as to increase yield rate of heat conduction pipe finished product. It is to be understood by those who are skillful in the art, that the length determination method can be conducted on a plurality of semi-finished heat conduction pipes at one time through appropriate design, so as to increase the production efficiency.

While this invention has been described by preferred embodiments mentioned above, it is to be understood these embodiments are only for illustrative purpose, and should not be considered as limitation on the range of the present invention. The equivalent variations or modifications are considered to be within the range of the present invention without departing from the spirit of this invention, which is well defined by the appended claims.

SYMBOL LIST OF MAIN COMPONENTS

1,1' equipment of length determination
1*a* housing
1*b* mask portion
10 enclosed space/vacuum environment
11 heating device
12 squelching and cutting device
14 brazing device
16 evacuation device
20 heat conduction pipe
20' heat conduction pipe
20*a'* shrunken portion
20*b'* cut portion

The invention claimed is:

1. A method of making a length of a heat conduction pipe in a vacuum environment from a semi-finished heat conduction pipe filled with heat transfer medium by an equipment which includes:

a housing having an enclosed space;

an evacuation device provided outside the housing for evacuating the enclosed space into the vacuum environment;

a squelching and cutting device provided in the enclosed space for squelching and cutting said semi-finished heat conduction pipe; and a brazing device provided in the enclosed space for brazing and sealing a cut end of said semi-finished heat conduction pipe;

the method comprising:

a material preparation step for preparing said semi-finished heat conduction pipe with a predetermined length sealed at both ends, a squelching and cutting step for squelching and cutting said semi-finished heat conduction pipe on a certain fixed point in the vacuum environment by the squelching and cutting device, and a sealing step for brazing and sealing the cut end of said semi-finished heat conduction pipe in the vacuum environment by the brazing device, wherein a plurality of semi-finished heat conduction pipes are processed at one time in the enclosed space.

* * * * *